(12) United States Patent
Takita

(10) Patent No.: US 7,405,859 B2
(45) Date of Patent: Jul. 29, 2008

(54) METHOD AND APPARATUS FOR SELECTING WAVELENGTH

(75) Inventor: Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/878,303

(22) Filed: Jul. 23, 2007

(65) Prior Publication Data

US 2007/0268552 A1     Nov. 22, 2007

Related U.S. Application Data

(63) Continuation of application No. PCT/JP2005/001139, filed on Jan. 27, 2005.

(51) Int. Cl.
*G02F 1/11* (2006.01)
*G02F 1/33* (2006.01)
*H04J 14/02* (2006.01)

(52) U.S. Cl. .................... 359/285; 359/308; 398/85; 398/95; 385/7

(58) Field of Classification Search .............. 359/285, 359/305, 308, 346, 578, 890; 398/34, 82, 398/85, 95, 101, 195, 207; 385/7, 15, 24, 385/27, 33, 37, 39, 70; 372/20, 26, 29.01, 372/29.02, 82, 98; 356/73.1, 512, 519; 250/227.18; 455/123

See application file for complete search history.

(56) References Cited

U.S. PATENT DOCUMENTS

| | | | | |
|---|---|---|---|---|
| 6,411,411 B1 * | 6/2002 | Okazaki et al. | ............. | 398/207 |
| 6,509,972 B2 * | 1/2003 | Korn | ............. | 356/519 |
| 6,845,108 B1 * | 1/2005 | Liu et al. | ............. | 372/20 |
| 7,283,750 B2 * | 10/2007 | Tian et al. | ............. | 398/85 |
| 2002/0041721 A1 | 4/2002 | Nakazawa | ............. | 385/7 |
| 2004/0179840 A1 | 9/2004 | Kai et al. | ............. | 398/33 |
| 2004/0190904 A1 | 9/2004 | Noguchi et al. | ............. | 398/85 |

(Continued)

FOREIGN PATENT DOCUMENTS

JP     3-233425     10/1991

(Continued)

OTHER PUBLICATIONS

Terumi Cikama, "Photonic Network" Magazine Fujitsu vol. 50, No. 4 (Jul. 1999) pp. 215-223.

(Continued)

*Primary Examiner*—Loha Ben
(74) *Attorney, Agent, or Firm*—Staas & Halsey LLP

(57) ABSTRACT

A wavelength selecting apparatus includes a wavelength selecting filter and that a monitoring filter are similar acousto-optic tunable filters; a light source that outputs light having a specific wavelength to the monitoring filter; a light receiving unit that detects a wavelength of light that has passed the monitoring filter; and a control unit that outputs, to the wavelength selecting filter, a control signal having a control frequency to selectively pass light of a desirable wavelength. The light source includes a light emitting element that emits light of a wide wavelength band; and an optical filter having at least two transmission bands through which the light passes to the monitoring filter. The control unit, based on at least two wavelengths of the light output by the light source, outputs a control signal having a control frequency corresponding to the desirable wavelength.

10 Claims, 8 Drawing Sheets

U.S. PATENT DOCUMENTS

2004/0197099 A1    10/2004   Kai et al. .................... 398/85
2005/0169633 A1*   8/2005    Nakagawa et al. ............ 398/85

FOREIGN PATENT DOCUMENTS

| JP | 6-120605    | 4/1994  |
|----|-------------|---------|
| JP | 10-262031   | 9/1998  |
| JP | 2002-40382  | 2/2002  |
| JP | 2003-344817 | 12/2003 |
| JP | 2004-260746 | 9/2004  |
| JP | 2004-260747 | 9/2004  |
| JP | 2004-282690 | 10/2004 |

OTHER PUBLICATIONS

International Search Report of International Published Application No. PCT/JP2005/001139 (mailed May 17, 2005).

PCT/Published Application No. WO 2006/080074, Published Aug. 3, 2006 (International Application No. PCT/JP2005/001139).

International Preliminary Report on Patentability issued in corresponding International Patent Application No. PCT/JP2005/001139, mailed on Aug. 9, 2007.

\* cited by examiner

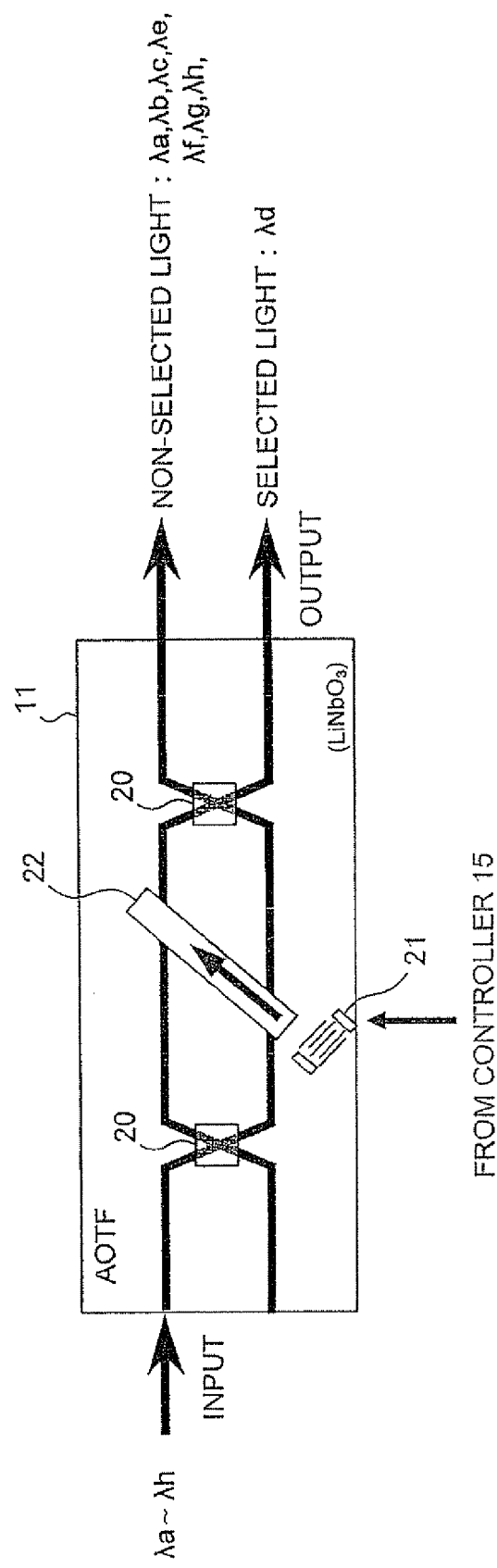

METHOD AND APPARATUS FOR SELECTING WAVELENGTH

CROSS-REFERENCE TO RELATED APPLICATIONS

This application is a continuation of International Patent Application No. PCT/JP05/01139 filed Jan. 27, 2005, which is incorporated herein by reference in its entirety.

BACKGROUND OF THE INVENTION

1. Field of the Invention

The present invention relates to a wavelength selecting apparatus and a wavelength selecting method.

2. Description of the Related Art

A tunable filter is conventionally placed in a photonic network as an important optical element used to select a wavelength required to split signal light. Among such optical elements used to select a wavelength, an acousto-optic tunable filter (AOTF) has particularly attracted attention in recent years. The AOTF is a type of optical filter that has merits, such as enabling a reduction in size and cost based on integration, in addition to high-speed properties of a wavelength selecting operation and extensiveness of a tunable range. A wavelength selecting apparatus based on this AOTF can be already put to practical use. However, an AOTF subsystem that includes a laser output unit and utilizes this laser as a reference light source to improve accuracy of wavelength selection based on the AOTF has also been proposed.

FIG. 9 is a view of a conventional AOTF subsystem. The AOTF subsystem includes a function unit that judges whether selection of a wavelength by an AOTF is appropriately performed and accordingly executes control. An AOTF subsystem 10 in the drawing includes an AOTF 11 that selects a wavelength, a reference light source unit 12, a monitoring AOTF 13, a light receiver 14, and a controller 15. This subsystem also includes a temperature controller 16 that executes control according to the temperature dependence of an element serving as a light source.

The AOTF subsystem 10 is configured to have both a wavelength selecting function of the AOTF, i.e., only transmitting signal light having a specific wavelength based on a radio frequency (RF) control signal input to the AOTF 11 from the controller 15 and a function of using reference light from the reference light source unit 12 to record a corresponding relationships between the RF control signal and the selected wavelength and deriving linear RF control signal-selected light wavelength characteristics to improve a selection accuracy for a light signal. According to such a configuration, when multiplexed light signals ($\lambda a$ to $\lambda h$) are input to the AOTF subsystem 10, a light signal ($\lambda d$) having a selected wavelength alone can be selected and transmitted.

FIG. 10 is a view showing a configuration of the AOTF. An operation of selecting a wavelength in the AOTF 11 will now be explained with reference to FIG. 10. The AOTF 11 and the monitoring AOTF 13 have the same element structure, however, they input signals to different ports depending on application, and hence they are individually depicted. The AOTF 11 includes a polarizing beam splitter (PBS) 20, a comb-like electrode 21, and a surface acoustic wave (SAW) waveguide 22 in a circuit manufactured on a lithium niobate ($LiNbO_3$) substrate.

When an RF control signal is applied to the comb-like electrode 21, a SAW is excited. In the linear SAW waveguide 22 through which the SAW is transmitted, a polarized wave having a particular wavelength rotates due to an acousto-optic effect. Here, when the PBS 20 integrated at an intersection of the circuit operates without being dependent on the polarized light, input light ($\lambda a$ to $\lambda h$) can be divided into selected light ($\lambda d$) and non-selected lights ($\lambda a$, $\lambda b$, $\lambda c$, $\lambda e$, $\lambda f$, $\lambda g$, and $\lambda h$) and led to different ports, respectively. A wavelength of the selected light is dependent on a frequency of the RF control signal applied to the comb-like electrode 21, and multiple selected lights can be obtained when multiple RF control signals are input. Selection of a wavelength by the AOTF 11 can be carried out by using the above-explained principle (refer to "Photonic Network" by Terumi Chikama, [online], July, 1999, Magazine FUJITSU, [retrieved Nov. 19, 2004, Internet <URL: http://magazine.fujitsu.com/index2.html>]).

As the reference light source unit 12, a unit configured by a light-emitting diode (LED) having a wide emission spectrum is disclosed in Japanese Patent Application Laid-open No. H3-233425, Japanese Patent Application Laid-open No. H6-120605, and Japanese Patent Application Laid-open No. H10-262031.

However, as a light source element of the reference light source unit 12 in the conventional AOTF subsystem 10, a distributed feedback-laser diode (DFB-LD) is used for its characteristic of outputting only one wavelength per element. This DFB-LD is advantageous in that a peak of an output waveform is prominent in the light receiver 14, and detection of the peak by the controller 15 is easy. On the contrary, the DFB-LD has problems, such as reduced reliability of the light source due to a temperature dependence or deterioration with time and a high cost. There is demand to configure the reference light source unit 12 using an element other than the DFB-LD. Furthermore, the peak of an output waveform cannot be detected when the LED alone is used as the reference light source unit 12 and the LED cannot be applied to the AOTF subsystem as it is.

SUMMARY OF THE INVENTION

It is an object of the present invention to at least solve the above problems in the conventional technologies.

A wavelength selecting apparatus according to one aspect of the present invention includes a wavelength selecting filter that is a first acousto-optic tunable filter; a monitoring filter that is a second acousto-optic tunable filter like the first acousto-optic tunable filter; a light source that outputs light having a specific wavelength to the monitoring filter; a light receiving unit that detects a wavelength of light that has passed the monitoring filter; and a control unit that outputs, to the wavelength selecting filter, a control signal having a control frequency to selectively pass light of a desirable wavelength. The light source includes a light emitting element that emits light of a wide wavelength band, and an optical filter having at least two transmission bands and through which the emitted light passes to be output to the monitoring filter. The control unit outputs the control signal that has the control frequency that corresponds to the light of the desirable wavelength, based on at least two wavelengths of the light output by the light source.

According to another aspect of the present invention, a wavelength selecting method of outputting a control signal having a control frequency that selectively passes a light of a desirable wavelength through a wavelength selecting filter of a pair of like acousto-optic tunable filters and of outputting the control signal based on a detected wavelength of a reference light of a specific wavelength when the reference light is passed through a monitoring filter of the pair of like acousto-optic tunable filters, includes outputting light of a wide wavelength band as the reference light to the monitoring filter, through an optical filter having at least two transmission bands, from a light emitting element; detecting at least two wavelengths in the specific wavelength of the reference light transmitted through the monitoring filter; calculating characteristic information of the control signal based on at least two of the detected wavelengths and the frequency of the reference signal respectively corresponding thereto; obtaining the control frequency corresponding to the desirable wavelength based on the characteristic information; and outputting the control frequency to the wavelength selecting filter.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is a view of an AOTF.

DETAILED DESCRIPTION OF THE PREFERRED EMBODIMENTS

Referring to the accompanying drawings, exemplary embodiments according to the present invention are explained in detail below.

Figure 1:
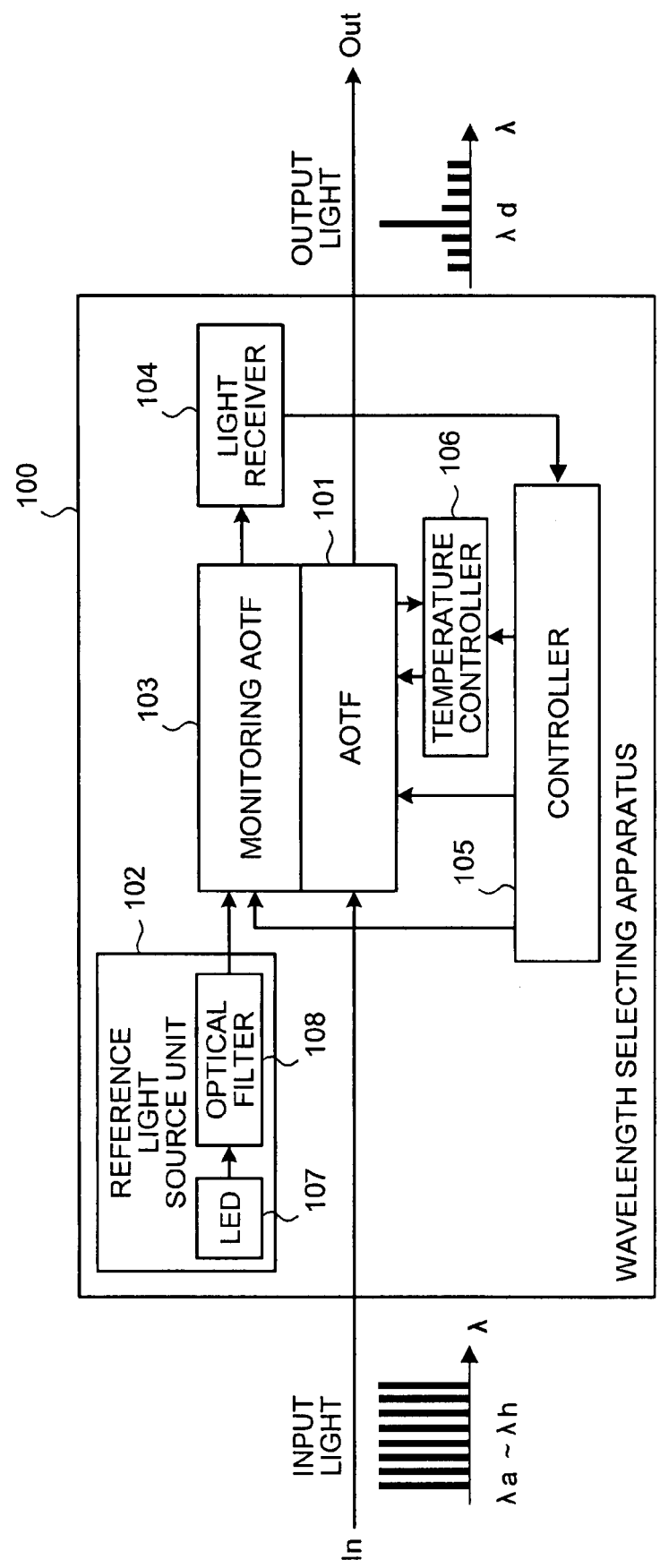
FIG. 1 is a diagram of a wavelength selecting apparatus according to an embodiment.

FIG. 1 is a diagram of a wavelength selecting apparatus 100 according to the present embodiment. The wavelength selecting apparatus 100 includes an AOTF 101 for wavelength selection, a reference light source unit 102, a monitoring AOTF 103, a light receiver 104, a controller 105, and a temperature controller 106.

Although the AOTF 101 and the monitoring AOTF 103 are realized by a single AOTF module configured as a module, the AOTF 101 and the monitoring AOTF 103 are individually depicted since they have independent input and output ports. The AOTF 101 selects light having an arbitrary wavelength from multiplexed signal lights ($\lambda a$ to $\lambda h$) input from the outside and transmits the selected light as output light ($\lambda d$) to the outside, and is used as a main function unit in the wavelength selecting apparatus 100.

Since the wavelength of light selected by the AOTF 101 is dependent on the frequency of the RF control signal applied by the controller 105, a relationship between the frequency of the RF control signal and the wavelength of the selected light must be derived to accurately select light having the arbitrary wavelength. The relationship between the frequency of the RF control signal and the wavelength of light selected by the AOTF 101 can be represented as a linear primary expression.

Therefore, light having a known wavelength is input to the monitoring AOTF 103, and a frequency value of the RF control signal required to allow this light having the known wavelength to be transmitted as selected light through the monitoring AOTF 103 is obtained. In regard to two or more lights having known wavelengths, a primary expression that is used to calculate a frequency of the RF control signal required to allow light having an arbitrary wavelength to be transmitted through the monitoring AOTF 103 is obtained from a frequency value that allows transmission through the monitoring AOTF 103.

The primary expression obtained by using the monitoring AOTF 103 is stored in the controller 105 and used when setting the frequency of the RF control signal that is required for transmission of arbitrary selected-light from among multiplexed signal lights input to the AOTF 101.

The reference light source unit 102 includes an LED 107 that outputs light having a broadband wavelength and an optical filter 108 having multiple transmission bands. For example, a general-purpose superluminescent-LED (SLED) can be used. The SLED can obtain an optical output that is at least −40 dBm in a broadband of, e.g., 1520 nanometers (nm) to 1590 nm, and is inexpensive (however, the dBm value is a value when performing observation using an optical spectrum analyzer having a resolution of 0.1 nm and is also applied to the following optical power). An emission wavelength can be a wavelength used in an L band based on a change in design as well as a wavelength in a C band. The reference light source unit 102 can be formed of an excitation light source and an erbium-doped fiber (EDF). Reference light output from the reference light source unit 102 includes peaks whose number corresponds to the number of transmission bands of the optical filter 108. A Fabry-Perot filter (FP filter) having two transmission bands in the optical filter 108 is used in this embodiment. As a result, the reference light source unit 102 outputs reference light having two peaks (wavelengths $\lambda 1$ and $\lambda 2$).

The reference light is input to the monitoring AOTF 103, and the RF control signal is also applied from the controller 105. The frequency of the RF control signal is variable, and the wavelength of light transmitted through the AOTF 101 and the monitoring AOTF 103, i.e., selected light varies in response to a change in frequency of the RF control signal as explained above.

The light transmitted through the monitoring AOTF 103 is received by the light receiver 104. The light receiver 104 includes a PD as a photo detector. The PD outputs a current value whose amount is in proportion to an intensity of light input thereto. Since the reference light (wavelengths $\lambda 1$ and $\lambda 2$) alone is input to the monitoring AOTF 103, a current value of the PD shows a peak when the RF control signal having a frequency that allows transmission of lights having $\lambda 1$ and $\lambda 2$ is applied.

Figure 2:
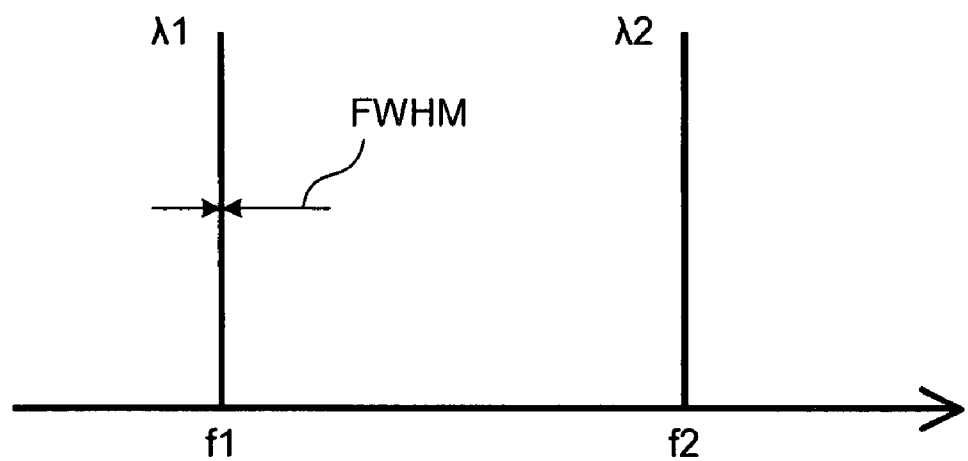
FIG. 2 illustrates an output spectrum from a general reference light source unit.
Figure 3:
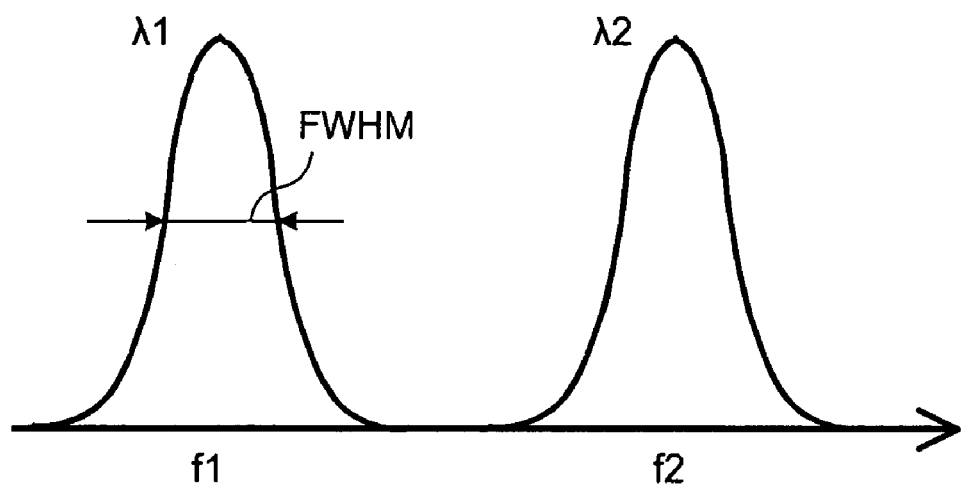
FIG. 3 illustrates an output spectrum from a reference light source unit according to the embodiment.
Figure 9:
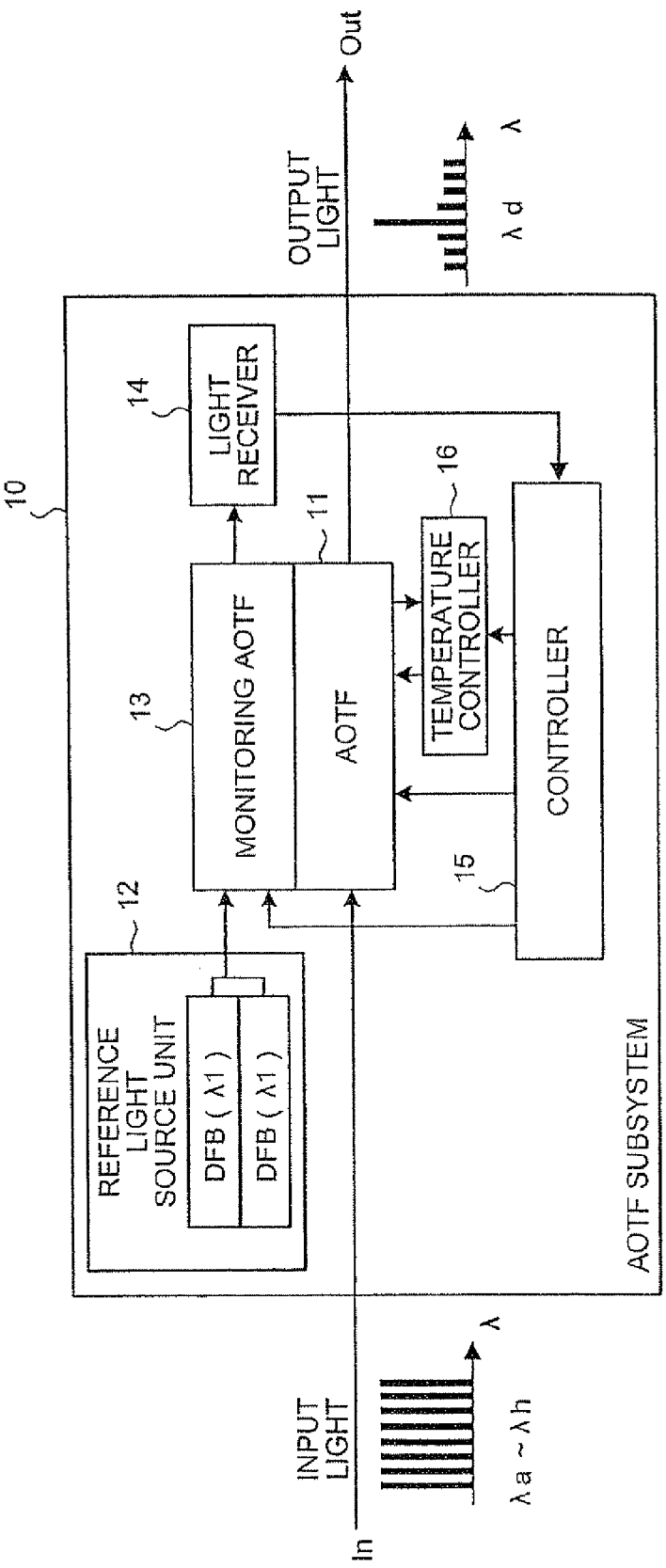
FIG. 9 is a view of a conventional AOTF subsystem.

FIG. 2 is a view of an output spectrum from a general reference light source unit, and FIG. 3 is a view of an output spectrum from the reference light source unit according to this embodiment. The abscissa represents frequency, and the ordinate represents output level. As shown in FIG. 2, reference light output from a reference light source unit 12 (see FIG. 9) using two DFB-LD's as a light source element shows a sharp output spectrum, and a light receiver 14 (see FIG. 9) can accurately detect a peak. Since the detected peak belongs to the reference light (wavelengths $\lambda 1$ and $\lambda 2$), the RF control signal allowing transmission of a light signal having an arbitrary wavelength can be derived from a relationship between the RF control signal at this time and the wavelengths $\lambda 1$ and $\lambda 2$, and using the derived signal as an RF control signal applied to the AOTF 101 enables highly accurate wavelength selection.

As shown in FIG. 3, the reference light output from the reference light source unit 102 according to the present embodiment has an output spectrum cut out based on transmission characteristics of the optical filter 108 (see FIG. 1), a full width at half-maximum (FWHM) is wide. If nothing is done, a peak cannot be accurately found by the light receiver 104.

This FWHM means a spreading width in a lateral direction at a height that is half of a peak amplitude of a waveform and is used as a value representing a transmissivity of the optical filter 108. Detection of a peak is easy when the FWHM is narrow. If reference light having such an output spectrum as depicted in FIG. 2 is a target, a FWHM is very narrow, and a peak can be readily detected. However, when the reference light source 102 includes the LED 107 and the optical filter 108 as in this embodiment, an FWHM is dependent on the transmissivity of the optical filter 108, and the FWHM can only be reduced to a value according to the performance of the optical filter 108. At the present time, there is no optical filter having transmission characteristics allowing transmission of a peak like the DFB-LD. Therefore, according to an embodiment of the present invention, the following method is used to accurately detect a peak corresponding to reference light even when the peak has an FWHM to some extent.

Figure 4:
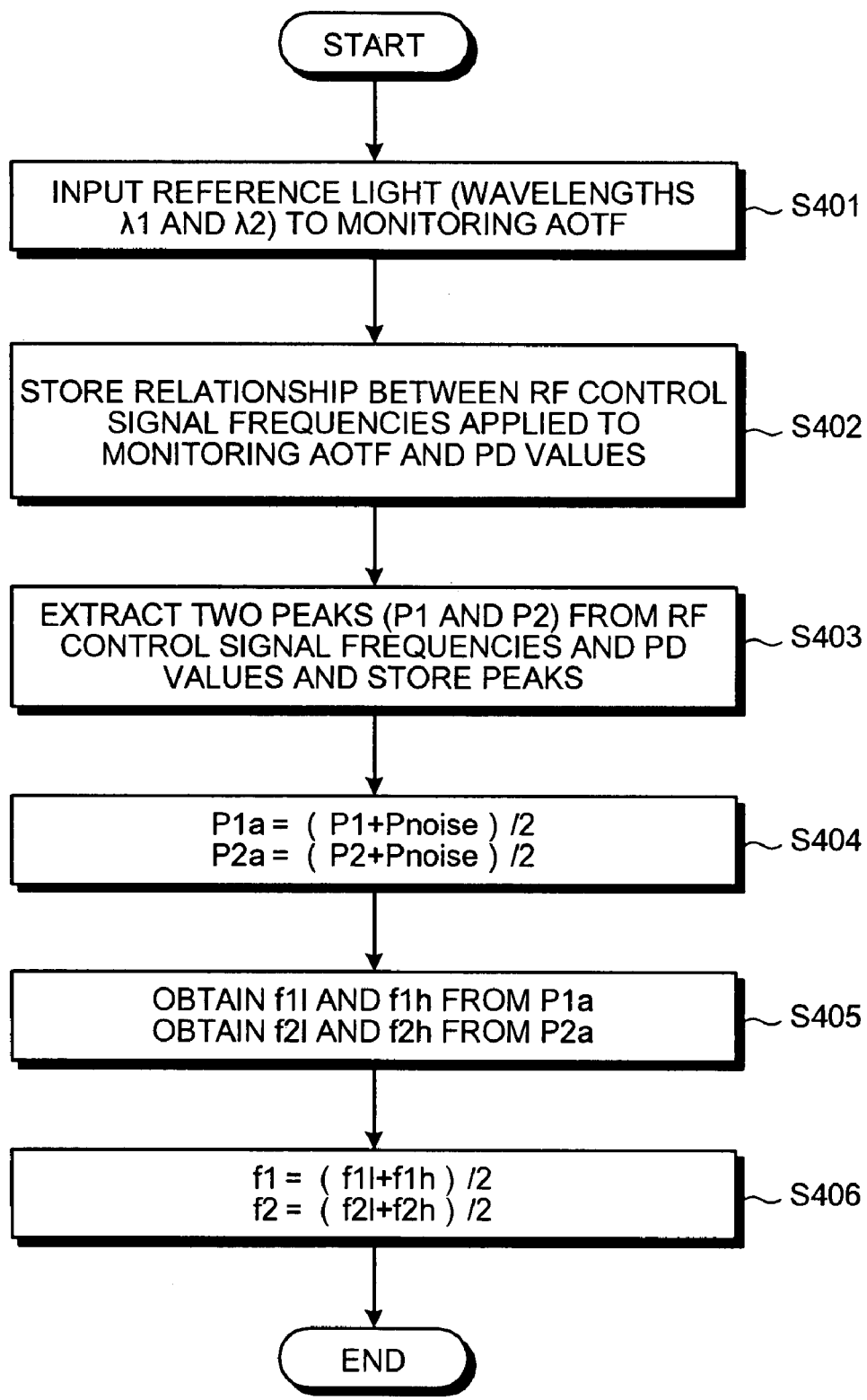
FIG. 4 is a flowchart of a peak detecting operation.

FIG. 4 is a flowchart of a peak detecting operation according to the embodiment. First, the reference light (wavelengths λ1 and λ2) is input to the monitoring AOTF 103 from the reference light source unit 102 (step S401).

Then, the controller 105 stores a relationship between the frequency of the RF control signal applied to the monitoring AOTF 103 and the read value of the PD in the light receiver 104 (step S402). At this step, the controller 105 applies the RF control signal, while changing the frequency, to the monitoring AOTF 103 that is receiving the reference light (wavelengths λ1 and λ2), and the light transmitted through the monitoring AOTF 103 is received by the light receiver 104. The light receiver 104 includes the PD, and a read value of this PD is supplied to the controller 105. The read value of the PD means a value of a current that flows when the PD receives light. Since an intensity of the light is in proportion to a current amount, the current value represents a relative light intensity as it is. Therefore, when the controller 105 stores a relationship between the frequency of the applied RF control signal and the read value of the PD corresponding to the frequency, this means that data required to obtain a frequency allowing transmission of the reference light is accumulated.

Figure 5:
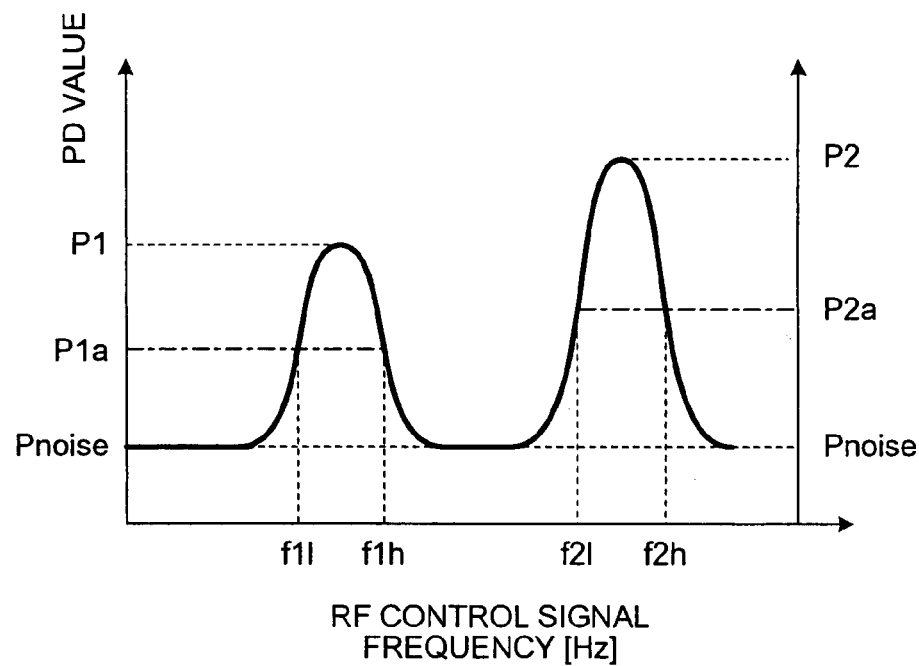
FIG. 5 is a graph of RF control signal frequency versus photo diode (PD) values.

Next, two peaks (P1 and P2) are extracted from the relationship between the frequency of the RF control signal and the read value of the PD, and the extracted peaks are recorded (step S403). FIG. 5 is a graph of RF control signal frequency and read values of the PD. The abscissa represents frequency (Hz) of the RF control signal applied from the controller 105, and the ordinate represents the corresponding read value of the PD in the light receiver 104. By the operation at step S402, the controller 105 has such a relationship as depicted in FIG. 5 recorded therein. The read value of the PD includes pure light transmitted through the monitoring AOTF 103 as well as noise of the PD element itself or noise generated due to light leaked from other ports. At step S403, a noise level Pnoise is first determined based on the relationship between the frequency of the RF control signal and the read value of the PD stored in the controller 105, and then two peaks (P1 and P2) are extracted from the read value of the PD and recorded.

Subsequently, the controller 105 obtains P1a (identification point) and P2a (identification point) serving as identification points from respective waveforms of the peak values P1 and P2 by using the following expressions 1 and 2 to detect true peaks corresponding to the reference light (wavelengths λ1 and λ2) by using Pnoise and the peak values P1 and P2 stored at step S403 (step S404).

$$P1a \text{ (identification point)} = (P1 + Pnoise)/2 \quad (1)$$

$$P2a \text{ (identification point)} = (P2 + Pnoise)/2 \quad (2)$$

Next, the P1a (identification point) and the P2a (identification point) obtained at step S404 are assigned to the relationship between the frequency of the RF control signal and the read value of the PD stored in the controller 105 and frequencies f1l and f1h of the RF control signal at P1a (identification point) and frequencies f2l and f2h of the RF control signal at P2a (identification point) are obtained (step S405). These f1l, f1h, f2l, and f2h are values of the two RF control signals (a short-wavelength f1l or f2l side and a long-wavelength f1h or f2h side) placed on the respective waveforms at the identification points P1a and P2a as shown in FIG. 5.

Subsequently, frequencies f1 and f2 of the RF control signal allowing transmission of the true peaks corresponding to the reference light (wavelengths λ1 and λ2) are obtained from f1l, f1h, f2l, and f2h acquired at step S405 by using the following expressions 3 and 4 (step S406), thereby terminating the peak detecting operation. Accurate detection by this peak detection method when the optical filter 108 having a FWHM of 0.8 nm or below is used has been experimentally demonstrated.

$$f1 = (f1l + f1h)/2 \quad (3)$$

$$f2 = (f2l + f2h)/2 \quad (4)$$

Figure 6:
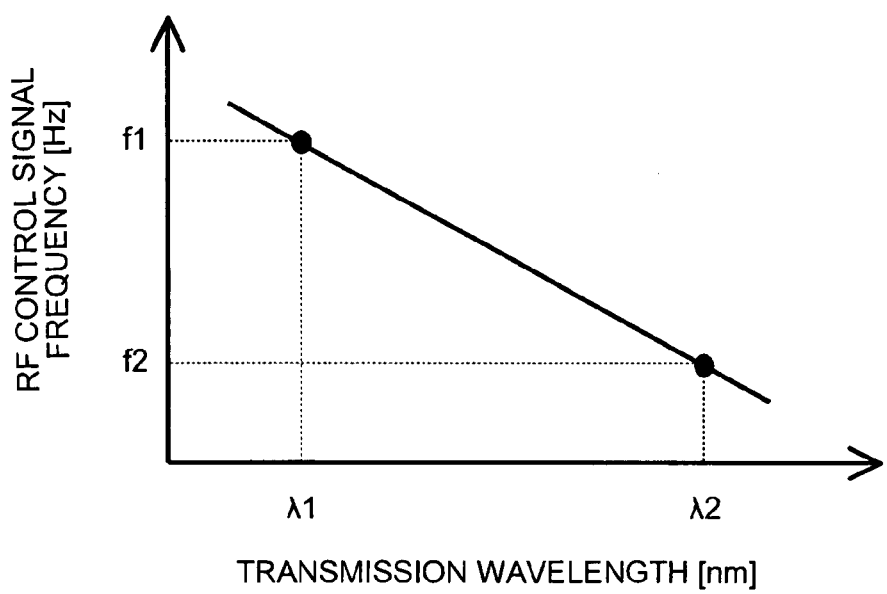
FIG. 6 is a diagram of RF control signal frequency versus transmission wavelength characteristics.

FIG. 6 is a diagram of RF control signal frequency-transmission wavelength characteristics. The ordinate represents RF control signal frequency (Hz), and the abscissa represents a transmission wavelength (nm). Since the reference light (wavelengths λ1 and λ2) and the frequencies f1 and f2 of the RF control signal allowing the reference light (wavelengths λ1 and λ2)) to be transmitted through the monitoring AOTF 103 are determined, a primary line representing RF control signal frequency-transmission wavelength characteristics can be obtained. This primary line can be acquired by using the following expression 5. A frequency f3 of the RF control signal that allows a light signal having an arbitrary wavelength λ3 to be transmitted can be set based on this primary line. The primary line represented by the expression 5 can be stored in a non-depicted storage unit provided in the controller 105.

$$f3 = (f1 - f2)/(\lambda 2 - \lambda 1) \times (\lambda 3 - \lambda 1) + f1 \quad (5)$$

Therefore, in the wavelength selecting apparatus 100 depicted in FIG. 1, the controller 105 can apply the RF control signal corresponding to a wavelength kd to the AOTF 101 that receives multiplexed light signals (λa to λh) to output from an Out port a light signal having a selected wavelength (λd in the depicted example) alone among the multiplexed light signals input from an In port. In regard to the frequency of the RF control signal applied in this example, expression 5 derived by using the reference light (wavelengths λ1 and λ2) can be read from the storage unit and used. When outputting light signals having multiple wavelengths, the multiple RF control signals obtained by using expression 5 may be applied. As explained above, a combination of the two reference light values and the frequency values of the control signal allowing transmission of the reference light is used to obtain a slope and an intercept of the primary expression, which represents the relationship between the wavelength light to be transmitted and the frequencies of the control signal. Then, the arbitrary wavelength light λ3 is input as a variable in the primary expression, expression 5, and the frequency f3 of the control signal allowing transmission of this arbitrary wavelength light is calculated.

Figure 7:
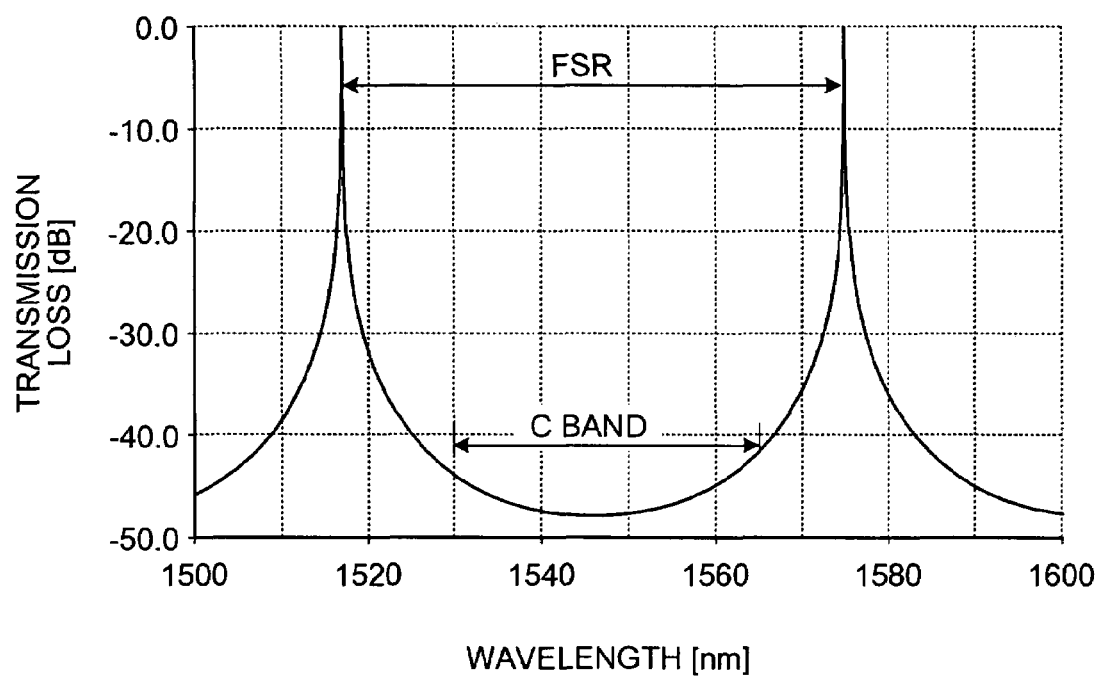
FIG. 7 is a diagram of transmission characteristics of an optical filter used in the embodiment.

FIG. 7 is a diagram of transmission characteristics of an example of the optical filter 108 used in the embodiment. The ordinate represents a transmission loss (dB), and the abscissa represents a wavelength (nm) of light to be transmitted. As shown in the figure, transmission characteristics of the optical filter 108 include two peaks. The optical filter 108 is a multilayer film type FP filter (manufactured by, e.g., Santec corporation; see Japanese Patent Application Laid-open No. 2004-138798 and Japanese Patent Application Laid-open No. 2004-177658), and has free spectral range (FSR) characteristics of 60 nm, a transmission loss of 5 dB or below, a C band suppression ratio of 15 dB or above, and a FWHM of 0.5 nm or below. The FSR is a value indicative of a peak interval of a waveform, and an element representing the transmissivity of the optical filter 108 such as an FWHM.

Commonly, light having a wavelength different from the wavelength band of the light signal that allows transmission is utilized as the reference light (wavelengths $\lambda 1$ and $\lambda 2$), and a wavelength having an arrangement where the two reference lights sandwich the wavelength band of the light signal is required. In present optical networks, light having a C band (1530 nm to 1565 nm) wavelength is mainly used, and characteristics enabling output of light having wavelengths sandwiching a C band are required as with the optical filter 108. Therefore, a wavelength band of a laser beam input from the LED 107 must be equal to or above an FSR width of the optical filter 108. In recent years, in addition to the C band, utilization of an L band (1565 nm to 1625 nm) having a longer wavelength has also advanced. When coping with multiplexed signal lights having such a wide band, the optical filter 108 having a wide FSR width sandwiching both the C band and the L band, and the LED 107 having a wavelength band that is equal to or above the FSR width are used.

Figure 8:
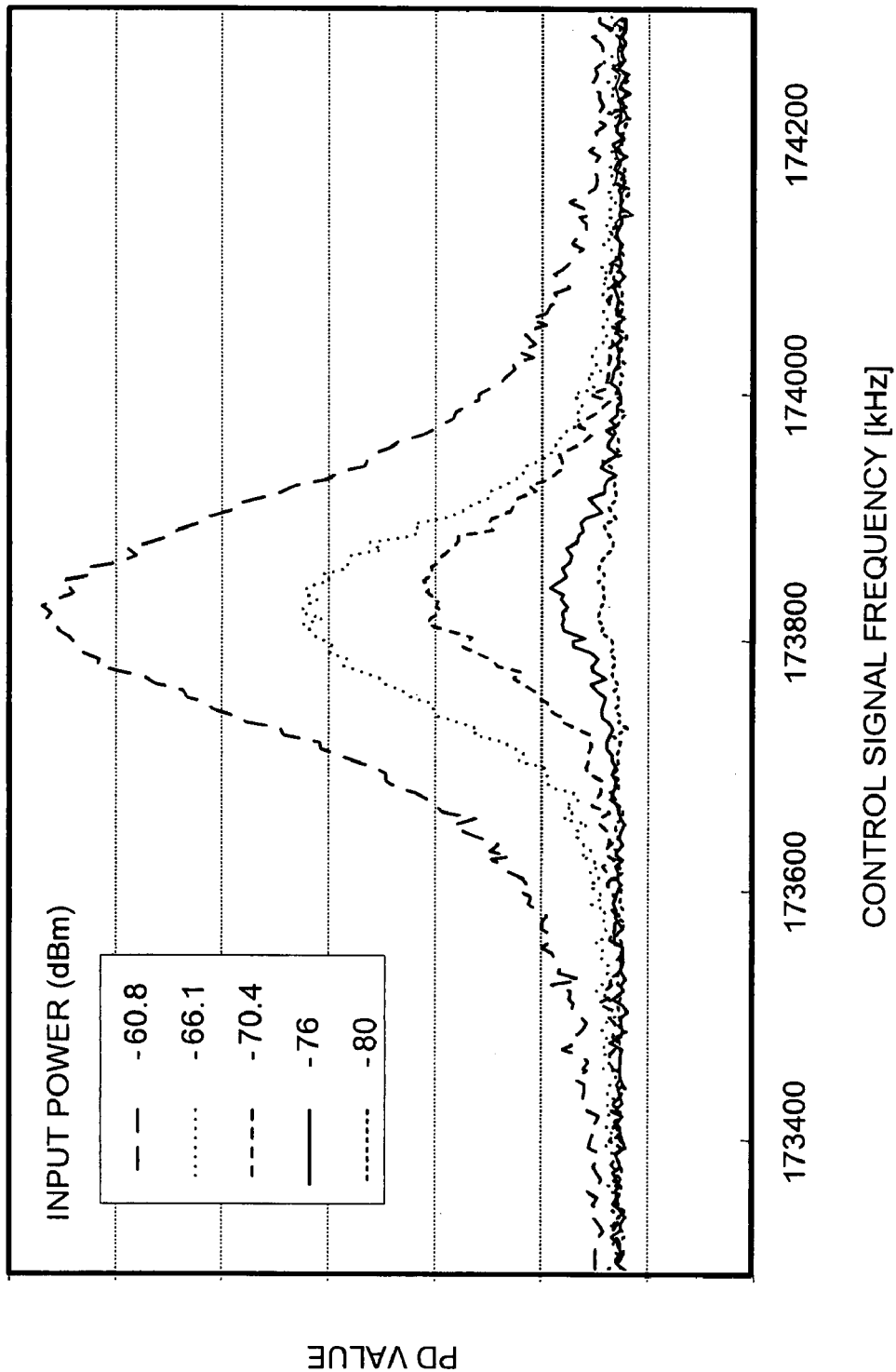
FIG. 8 is a diagram of PD values for each light signal power at the time of input to the PD.

FIG. 8 is a diagram of a read value of the PD with respect to each power of a light signal at the time of input to the PD. Performance of the LED 107 (see FIG. 1) constituting the reference light will now be examined with reference to this FIG. 8. The abscissa shown in FIG. 8 represents a control signal frequency (kHz) from the controller 105, and the ordinate represents a PD read value (relative intensity of light) in the light receiver 104. A waveform of a read value of the PD varies with respect to each value of a power (input power) of the reference light at the time of input to the PD. With consideration of the results and experimental data depicted in FIG. 8, an input power that is not smaller than −65 dBm is required to obtain a waveform that enables discrimination of a peak. As explained above, the transmission loss of the optical filter 108 (FP filter) according to this embodiment is equal to or below 5 dB, and a transmission loss of the AOTF 103 is 5 dB at worst. Therefore, an output power of the LED 107 that is equal to or above −55 dBm may be provided to assure an input power that is equal to or above −65 dBm at the time of input to the PD.

As explained above, in the LED 107 constituting the reference light source unit 102 according to the embodiment, an output laser bandwidth should be 30 nm or above and an output power should be −55 dBm or above to cope with at least one band (e.g., the C band or the L band). In the optical filter 108, an FSR is preferably 30 nm or above to generate reference light sandwiching at least one band, and an FWHM is preferably 0.8 nm or below to detect each peak.

Demand for such conditions can be satisfied by using a general LED element or a general optical filter. The wavelength selecting apparatus 100 according to the present embodiment can be manufactured at a lower cost than that of a conventional AOTF subsystem. Since the optical filter 108 is a passive element, age-related deterioration does not occur. Facets of the LED 107 rarely deteriorate compared with the DFB-LD, and precise wavelength control is not required. Therefore, the LED 107 has less factors of age-related deterioration, and has a long life. Based on these matters, the entire reference light source unit 102 is highly reliable, and its stable performance can be maintained.

According to the embodiments describe above, a reference light source unit can be configured using a general-purpose optical component and a low cost wavelength selecting apparatus having high reliability with less aged deterioration can be effected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wavelength selecting apparatus comprising:
   a wavelength selecting filter that is a first acousto-optic tunable filter;
   a monitoring filter that is a second acousto-optic tunable filter like the first acousto-optic tunable filter;
   a light source that outputs light having a specific wavelength to the monitoring filter;
   a light receiving unit that detects a wavelength of light that has passed the monitoring filter; and
   a control unit that outputs, to the wavelength selecting filter, a control signal having a control frequency to selectively pass light of a desirable wavelength, wherein the light source includes
      a light emitting element that emits light of a wide wavelength band; and
      an optical filter having at least two transmission bands and through which the emitted light passes to be output to the monitoring filter, and
   the control unit outputs the control signal that has the control frequency that corresponds to the light of the desirable wavelength, based on at least two wavelengths of the light output by the light source.

2. The wavelength selecting apparatus according to claim 1, wherein
   the control unit further outputs to the monitoring filter, by a reference signal, a frequency to pass light through the monitoring filter and outputs the control signal based on a relation between at least two wavelengths detected by the light receiving unit and the frequency corresponding thereto of the reference signal.

3. The wavelength selecting apparatus according to claim 2, wherein the control unit includes
   an applying unit that applies the reference signal to the monitoring filter;
   an identifying unit that identifies the wavelengths of the light output by the light source, based on the reference signal and a value read by the light receiving unit corresponding to the reference signal;
   a creating unit that creates, based on the identified wavelengths and the reference signal allowing respective transmission thereof, a primary expression to obtain the control frequency;
   a storage unit that stores the primary expression; and
   a calculating unit that calculates the control frequency from the stored primary expression.

4. The wavelength selecting apparatus according to claim 3, wherein
the creating unit obtains a slope and an intercept of the primary expression by combining the two wavelengths and the frequency corresponding thereto of the reference signal, and
the calculating unit substitutes the desirable wavelength as a variable in the primary expression to calculate the control frequency.

5. The wavelength selecting apparatus according to claim 3, wherein
the identifying unit determines, based on a relation between the light passed through the wavelength selecting filter and the monitoring filter and the frequency of the control signal, a frequency of a control signal for an average of values near a peak value of the light passed through the wavelength selecting filter and the monitoring filter as the frequency of the reference signal.

6. The wavelength selecting apparatus according to claim 3, wherein
the identifying unit includes
an obtaining unit that obtains transmission characteristics indicative of correspondence between the frequency of the reference signal and the value of the light that has passed through the monitoring filter when the reference signal is applied;
an extracting unit that extracts, from the transmission characteristics, a noise component included in the value and a peak component of the value;
an identification-point acquiring unit that acquires an identification point by dividing a sum of the noise component and the peak component by two; and
a frequency acquiring unit that acquires a frequency midway between two frequencies each corresponding to a control signal at the identification point in the transmission characteristics, and the identifying unit obtains a plurality of frequencies corresponding to a plurality of wavelengths in the specific wavelength.

7. The wavelength selecting apparatus according to claim 1, wherein the light emitting element is a light emitting diode.

8. The wavelength selecting apparatus according to claim 1, wherein the optical filter is a multilayer Fabry-Perot filter.

9. The wavelength selecting apparatus according to claim 1, wherein the monitoring filter and the wavelength selecting filter have a port for monitoring and a port for wavelength selection independently provided on a single element.

10. A wavelength selecting method of outputting a control signal having a control frequency that selectively allows transmission of a light of a desirable wavelength through a wavelength selecting filter of a pair of like acousto-optic tunable filters, the control signal being output based on a detected wavelength of a reference light of a specific wavelength when the reference light is passed through a monitoring filter of the pair of like acousto-optic tunable filters, the wavelength selecting method comprising:
outputting light of a wide wavelength band as the reference light to the monitoring filter, through an optical filter having at least two transmission bands, from a light emitting element;
detecting at least two wavelengths in the specific wavelength of the reference light transmitted through the monitoring filter;
calculating characteristic information of the control signal based on at least two of the detected wavelengths and the frequency of the reference signal respectively corresponding thereto;
obtaining the control frequency corresponding to the desirable wavelength based on the characteristic information; and
outputting the control frequency to the wavelength selecting filter.

* * * * *